Figure 2:
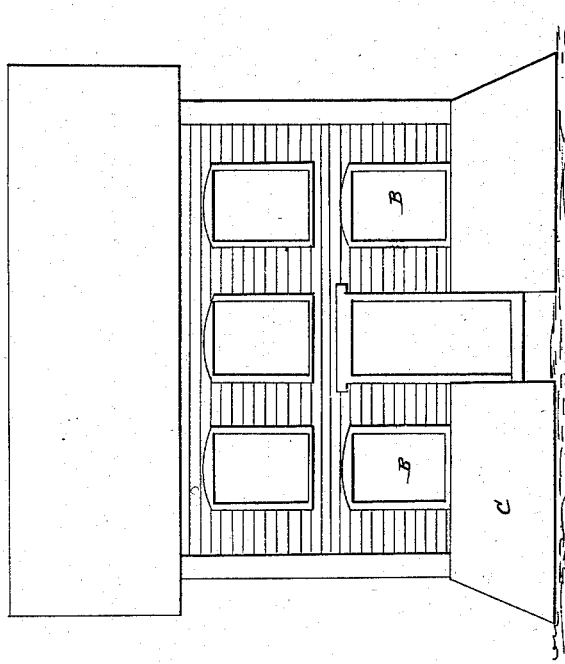
Figure 1:
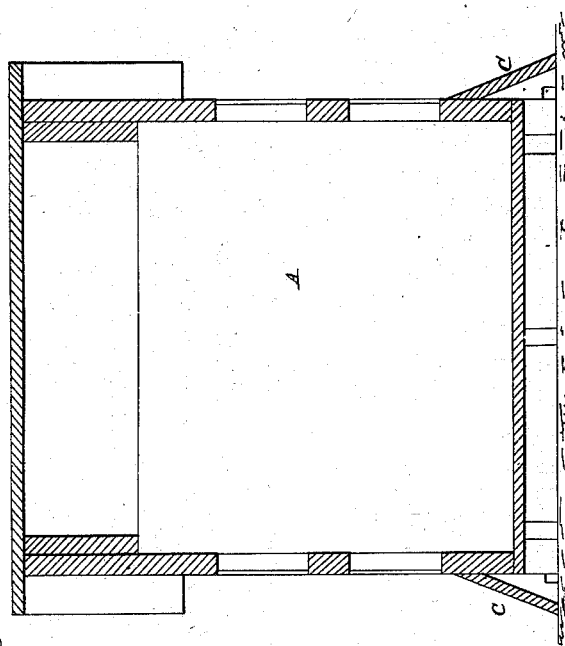

H. Sidle.
Constructing Houses.

No. 59,929.        Patented Nov. 20, 1866.

Witnesses:
C. A. Alexander
J. M. Mason

Inventor:
Henry Sidle

United States Patent Office.

IMPROVEMENT IN CONSTRUCTION OF HOUSES.

HENRY SIDLE, OF MINNEAPOLIS, MINNESOTA.

Letters Patent No. 59,929, dated November 20, 1866.

SPECIFICATION.

TO ALL WHOM IT MAY CONCERN:

Be it known that I, HENRY SIDLE, of Minneapolis, in the county of Hennepin, and State of Minnesota, have invented certain new and useful improvements in mode of protecting houses and cellars from cold; and I do hereby declare that the following is a full, clear, and exact description of the same, reference being had to the accompanying drawings, and to the letters of reference marked thereon.

The nature of my invention consists in forming around a house, beneath the lower windows, a casing of any suitable material whereby an air-tight chamber is formed between the sides of the house and the casing, as will be represented.

In the drawings A represents a house of any ordinary construction, and B B the lower windows. C represents the casing, which stands at an angle to and against the house at its upper edge. The bottom of this casing is buried in the ground so that no air can get under it.

It will be seen that when the casing is made tight and close in its joints, and lies closely against the house at its upper edge, with its lower edge buried in the ground, an air-tight chamber is formed which in a great measure cuts off cold air from the lower portion of the building, and thus renders said building warmer than it would otherwise be. A great deal of cold air gets into buildings around their foundations or bases, and even with the best constructed floors and foundations there will always be some inlets for cold air. This mode of surrounding a building with a casing, the lower edge of which is buried in the ground, cuts off cold currents of air, while it prevents the extremely cold atmosphere of northern winters penetrating the building through the air-chamber which is formed. This casing also protects cellars, while it will prevent moisture from penetrating and rotting the foundations of wooden houses.

Having thus fully described my invention, what I claim as new, and desire to secure by Letters Patent, is—

The casing C, placed in an inclined position, and used below the lower windows of the house, with its lower edge buried, so as to form an air-tight chamber between it and the house, as and for the purpose specified.

As evidence that I claim the foregoing, I have hereunto set my hand in the presence of witnesses.

HENRY SIDLE.

Witnesses:
C. M. ALEXANDER,
J. M. MASON.